US009026325B1

(12) United States Patent
Roettger et al.

(10) Patent No.: US 9,026,325 B1
(45) Date of Patent: May 5, 2015

(54) MOTOR CONTROLLER WITH EXTERNALLY ADJUSTABLE POWER RATE CONSTRAINTS

(75) Inventors: Thomas D. Roettger, Finksburg, MD (US); Mohamed Belkhayat, Annandale, VA (US); Craig J. Nordby, Ellicott City, MD (US); Joseph M. Maurio, Westminster, MD (US); William Patalon, Fallston, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 445 days.

(21) Appl. No.: 13/045,344

(22) Filed: Mar. 10, 2011

(51) Int. Cl.
| | |
|---|---|
| *G06F 17/00* | (2006.01) |
| *B63H 21/21* | (2006.01) |
| *B63H 23/00* | (2006.01) |
| *B60L 3/12* | (2006.01) |
| *B63H 5/125* | (2006.01) |
| *B63H 23/24* | (2006.01) |
| *B60L 3/00* | (2006.01) |

(52) U.S. Cl.
CPC ........ *B63H 21/21* (2013.01); *B63H 2005/1258* (2013.01); *B63H 21/213* (2013.01); *B60L 3/12* (2013.01); *B63H 23/24* (2013.01); *B60L 3/00* (2013.01)

(58) Field of Classification Search
CPC ...... B63H 21/213; B63H 21/21; B63H 23/24; B63H 2005/1258; B60L 3/00; B60L 3/12; B63B 2755/00
USPC ............ 701/3, 7, 21, 54; 318/3, 4, 34, 59, 61, 318/64, 66, 98; 440/1, 84, 86, 87; 244/75.1, 244/76, 191, 194
See application file for complete search history.

(56) References Cited

U.S. PATENT DOCUMENTS

| | | | | |
|---|---|---|---|---|
| 5,220,259 | A * | 6/1993 | Werner et al. ................. | 318/432 |
| 6,532,454 | B1 * | 3/2003 | Werbos ......................... | 706/14 |
| 6,752,670 | B2 * | 6/2004 | Geil .................................. | 440/1 |
| 7,007,176 | B2 * | 2/2006 | Goodfellow et al. ......... | 713/300 |
| 7,058,522 | B2 * | 6/2006 | Chen ............................... | 702/60 |
| 7,095,131 | B2 * | 8/2006 | Mikhail et al. .................. | 290/44 |
| 8,062,081 | B2 * | 11/2011 | Barrett et al. ..................... | 440/1 |
| 8,118,627 | B2 * | 2/2012 | Wejrzanowski et al. .......... | 440/3 |
| 8,762,022 | B1 * | 6/2014 | Arbuckle et al. ............... | 701/85 |
| 2004/0257059 | A1 * | 12/2004 | Mansingh et al. ......... | 324/76.11 |
| 2008/0182466 | A1 * | 7/2008 | Wegner-Donnelly et al. .. | 440/84 |
| 2008/0238391 | A1 * | 10/2008 | Williams et al. .............. | 323/283 |

FOREIGN PATENT DOCUMENTS

WO WO-2007121322 A2 * 10/2007 ............. G06F 17/10

OTHER PUBLICATIONS

Sudhoff, S.D., et. al. "DC Link Stabilized Field Oriented Control of Electric Propulsion Systems", IEEE Transactions on Energy Conversion, vol. 13, No. 1, Mar. 1998.

* cited by examiner

*Primary Examiner* — Jack W Keith
*Assistant Examiner* — Chuong P Nguyen
(74) *Attorney, Agent, or Firm* — Marsteller & Associates, P.C.

(57) ABSTRACT

This invention relates to the field of very high current integrated power systems and defines a system where an alternating current inductive generator (13), controlled by a generator voltage regulator (14), is coupled to alternating current inductive load (11), controlled by an alternating current inductive load controller (12), all controlled by a supervisory control and data acquisition system (17) with externally adjustable power rate constraints (21) that define a new anticipatory mode integrated power system (10).

7 Claims, 7 Drawing Sheets

FIG. 1A

IPS Parameter Sets

| IPS constant parameter set, comprised of | IPS dynamic parameter set, comprised of |
|---|---|
| 100. Ideal operating load temperature range | 150. Current load temperature |
| 101. Maximum load temperature | 151. Current generator temperature |
| 102. Ideal operating generator temperature range | 152. Current components vibration level |
| 103. Maximum generator temperature | 153. Current power rate constraint |
| 104. Maximum components vibration | 154. Current power transient level |
| 105. Default power rate constraint | 155. Current power transient jitter |
| 106. Maximum power transient | 156. Current power transient oscillation |
| 107. Maximum power transient jitter | 157. Current phase angle |
| 108. Maximum power transient oscillation | 158. Current IPS safety margin |
| 109. Ideal phase angle range | 159. Current IPS power margin |
| 110. Ideal IPS safety margin | 160. Anticipated power rate constraint |
| 111. Ideal IPS power margin | 161. Anticipated power transient |
|  | 162. Recommended power rate constraint |

Ship ISPS Parameter Sets

| Ship ISPS constant parameter set, comprised of | Ship ISPS dynamic parameter set, comprised of |
|---|---|
| 200. Ideal operating motor temperature range | 250. Current motor temperature |
| 201. Maximum motor temperature | 251. Current turbine generator temperature |
| 202. Ideal operating turbine generator temperature range | 252. Current ship components vibration level |
| 203. Maximum turbine generator temperature | 253. Current ship power rate constraint |
| 204. Maximum ship components vibration | 254. Current ship power transient level |
| 205. Default ship power rate constraint | 255. Current ship power transient jitter |
| 206. Maximum ship power transient | 256. Current ship power transient oscillation |
| 207. Maximum ship power transient jitter | 257. Current phase angle |
| 208. Maximum ship power transient oscillation | 258. Current ISPS safety margin |
| 209. Ideal phase angle range | 259. Current ISPS power margin |
| 210. Ideal ISPS safety margin | 160. Anticipated ship power rate constraint |
| 211. Ideal ISPS power margin | 161. Anticipated ship power transient |
| 212. Ideal anti-cavitation sensor level | 162. Recommended power rate constraint |
| 213. Ideal motor acoustics sensor level | 160. Current anti-cavitation sensor level |
|  | 161. Current motor acoustics sensor levie |

MOTOR CONTROLLER WITH EXTERNALLY ADJUSTABLE POWER RATE CONSTRAINTS

BACKGROUND OF THE INVENTION

1. Technical Field

This invention relates generally to the field of very high power integrated power systems involving alternating current power generation coupled to alternating current or direct current power components, and more specifically, to an integrated ship power system with electric motor propulsion powered by a main turbine generator all controlled by a supervisory control and data acquisition system with externally adjustable power rate constraints that define an anticipatory mode design via new power control electronics. Applications are comprised of the field of ship propulsion, other large propulsion motors, or any variant wherein the load is significant, on a percentage basis, to the generation available such as electromagnetic launch of aircraft, high power microwave weapons and high power laser weapons.

2. Background Art

Integrated power systems involving alternating current and/or direct current high power components have traditionally been implemented with reactive system designs that operate stably only within a small range of power generation and consumption. One particular limitation has involved achieving stable power system operation when the desired dynamic changes in a high power load is not supported by the power system generation capacity. Current integrated power systems as designed can remain stable only by accommodating limited and relatively small changes to this power flow between the generator capacity and the power load demands.

As applied to an integrated ship power system with electric motor propulsion powered by a main turbine generator, the limitations of current reactive system designs limits selection of ship acceleration and/or the rate at which the ship velocity can be changed. Currently, ship accelerations are generally limited to normal, rapid and emergency rates, torques or power settings that a ship's captain can utilize for changes in the ship's velocity. Changes must be slow to minimize electrical transients due to the limitations of the reactive mode design. This is because the ship motor load demand can change more quickly than the steam valve controlling the main steam turbine and the steam turbine generator itself can respond. The inability of the steam turbine generator to respond as quickly as the ship motor load demand leads to electrical power system instability.

Additionally, present day motor controllers adjust ship velocity by maintaining constant motor speed, torque, or power and are not typically concerned with power rate demands placed on the turbine generator and this may lead to electrical instability. A potential solution, to slow down the motor controller response, is a novel nonlinear motor controller described by Sudhoff, et. al. in "DC Link Stabilized Field Oriented Control of Electric Propulsion Systems", IEEE Transactions on Energy Conversion Vol. 13, No. 1, March 1998. Yet, this paper or others in the field, do not take advantage of a supervisory control and data acquisition system and solve the problem with a limited range of power rate constraints to the motor controller.

The current state-of-the-art is represented by a reactionary design: a new ship rate is obtained by a request that is intended to induce a higher speed (RPM) of the electric motor, where the motor load increases, which in turn slows down the electrical generator, and the governor to the main turbine generator then responds and increases steam to the turbine to provide more power. The electrical load forces the response of the turbine generator governor. This reactionary design has serious limitations due to the fact that the dynamic response of a high power inductive propulsion motor can be very much quicker than the dynamic response of the mechanical valves that control the turbine generator speed. This mismatch between the load reaction and electrical power generation leads to instability of the electrical power system. Defined by the present invention is an anticipatory control mode integral to the integrated power system with control provided by the supervisory control and data acquisition (heretofore referred to as SCADA). Applied to ship propulsion, this enhanced integrated power system introduces the possibility of anticipating, by way of computing, the transient response of the integrated power system to a proposed commanded change of ship velocity; that allows the system to implement externally adjusted power rate of change constraints that correspond to the commanded ship velocity change by precisely controlling the anticipated, and real-time, power flow between the main turbine generator and the propulsion motor and assures electrical system stability with increased range of ship rate of change control.

However, such a very high power integrated power system involving alternating current high power generation capacity coupled to highly dynamic large alternating current or direct current loads, all controlled by a SCADA system, with the ability to accept or define power rate constraints, has not been used in the field of ship propulsion, other large propulsion motors, or any variant wherein the load is significant, on a percentage basis, to the generation available such as electromagnetic launch of aircraft, high power microwave weapons and high power laser weapons. There are numerous reasons for this non-use, such as the availability of extremely high current control devices capable of integration into a distributed, computer controlled, high power alternating current or direct current power system. Additionally, in several industries, generally speaking, a SCADA system refers to a system that does not control processes in real-time, but rather coordinates processes. Currently, SCADA systems are then typically seen as distinct from distributed control systems and are not implemented as defined by the present invention.

While the above cited references introduce and disclose a number of noteworthy advances and technological improvements within the art, none completely fulfills the specific objectives achieved by this invention.

DISCLOSURE OF INVENTION

The problem to be solved involves high electrical power generation connected to dynamic loads that can change more rapidly in time than the power generation can respond. For example, large motor loads ("large" defined as a significant percentage of the generation capacity) can lead to electrical instability because the response times of the motor load can be quicker than that of the reactionary mode power generation.

In accordance with the present invention, the anticipatory very high power integrated power system uniquely integrates and coordinates a SCADA controlled electronic load controller to provide externally adjustable power rate constraints that enable the system to respond to command changes in power flow in a controlled and stable manner while providing an extended range of stable operation. The control provided by a SCADA system, for example in a ship integrated power system, manages the power transfer between the main turbine generator and the propulsion motor and assures electrical system stability by providing the coordination of power and power rates between what the main turbine generator can provide and what the propulsion motor demands and an increased range of ship speed operation within this maintained range of stability. The SCADA system is programmed with information on the capabilities and limitations of both the generator and motor within a specific ship application and can provide the best power rate constraints to implement the next commanded ship velocity. This degree of control provides the delicate and continuous balance between the limiting parameters of what the power generation can provide and the potential limiting parameters for the load. This system specifies that the motor controller accept the power rate constraint defined by the command input for rate change and manages the anticipated ship integrated power response to this command input.

The SCADA system computes the predictable response of the main turbine generator to commanded changes in the propulsion motor load and produces a new power rate constraint. Therefore, a power transient will be known before it happens and the supervisory control and data acquisition system will optimize the performance of the main turbine generator and the propulsion drive so that the transient is minimized and the life of the equipment is extended. The power draw of the propulsion motor can be managed to be under the maximum potential power increase that the main turbine generator would be allowed to have. This control between the main turbine generator and the propulsion motor would literally foresee impedance of the drive to be higher than the impedance of the generator thereby providing a guarantee of electrical stability relative to the drive. This means no more large, expensive, and temperamental power system capacitors.

In accordance with the present invention, a very high power, anticipatory mode, integrated power system includes an electronic load that is powered by a electric generator. These elements are controlled by a supervisory control and data acquisition system with the ability to accept or define power rate constraints in a new and effective manner.

Embodiments of the present invention provide a system and method for a very high power integrated power system enabling higher electric power system stability and increased operator control with the extension of power system component lifetime and lower maintenance costs.

These and other objects, advantages and preferred features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

Figure 1A:
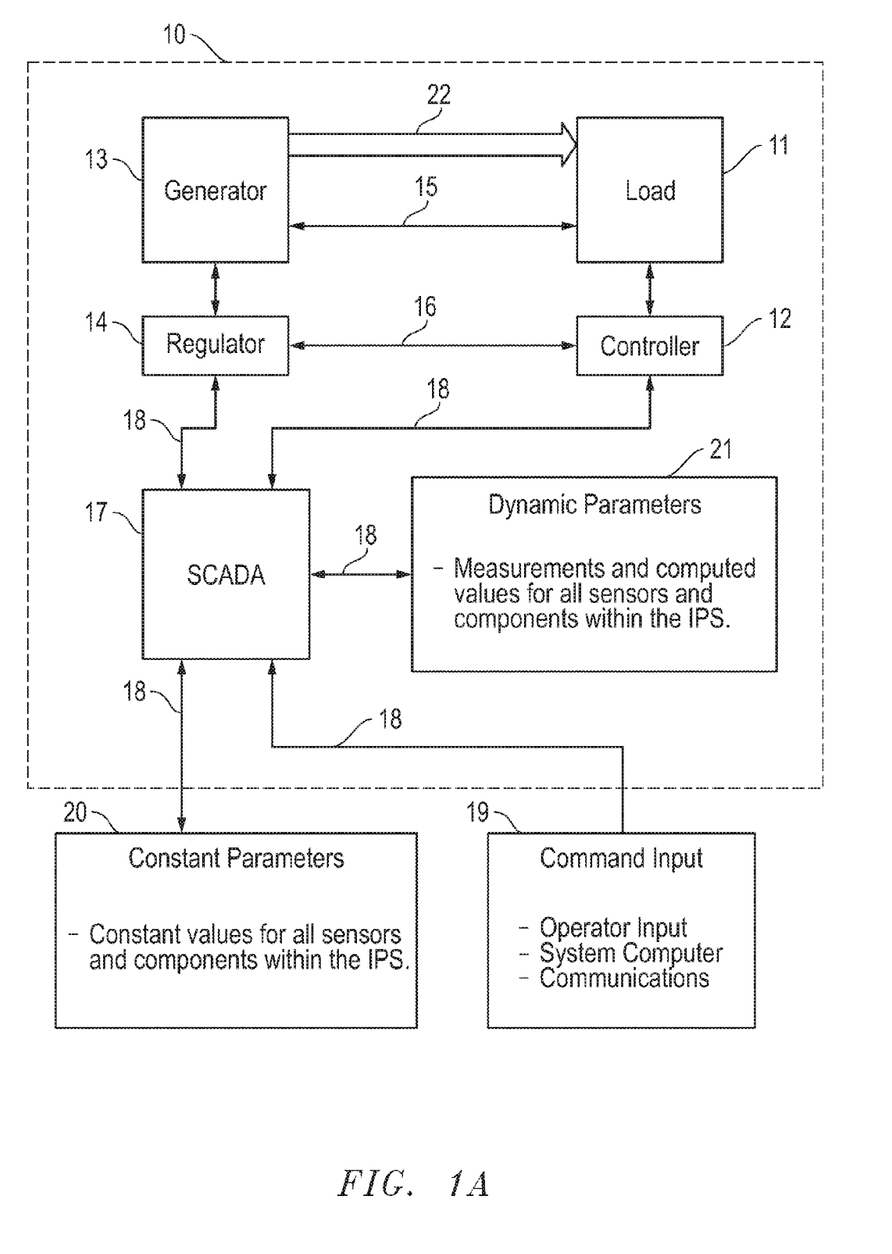
FIGS. 1A and 1B illustrate one embodiment of a very high power integrated power system involving alternating current power generation coupled to alternating current power components.

FIG. 1A illustrates a block diagram functional view of one embodiment of an integrated power system 10 for operating an alternating current generator 13 coupled to an alternating current or direct current load 11. This load can be a single load or a number of large loads and smaller loads which together constitute the total load that must be managed and will simply be referred to as "Load". For example, a Load could be one crane in a steel mill and the rest of the steel mill facility. The integrated power system (IPS) 10 will receive input as an operator commanded change in load power 19 which is communicated to a SCADA module 17 which performs all the computations necessary for implementing the operator commanded change in load power 19 as well as data collection and coordination of all the major components of the IPS 10. In this embodiment of the present invention, these components are comprised of the alternating current or direct current load 11, an alternating current or direct current load controller 12, the alternating current generator 13, and a generator voltage regulator 14. The IPS 10 may also include a dynamic parameter set 21 containing data both measured and computed by the SCADA module 17 and comprised of elements listed in FIG. 1B to be reviewed below. The IPS 10 may also include accessed data in the form of a constant parameter set 20 containing fixed data characterizing the components of the IPS 10 and required by the SCADA module 17 and comprised of elements listed in FIG. 1B to be reviewed below. The IPS 10 may also include the capacity to receive commanded input in the form of the operator commanded change in load power 19 which may be comprised of: operator initiated commands for changes in the load power rate, control input originating from a connected system, and control input originating from a connected communications line. In this embodiment of the present invention, all legitimate command input originating from the operator commanded change in load power input 19 is to be processed by the SCADA module 17.

Referring to FIG. 1A, the alternating current or direct current load 11 is controlled by the alternating current or direct current load controller 12 and is subject to be responsive in the way of increasing or decreasing work done which increases or decreases the load burden to the alternating current generator 13. In this embodiment, these changes are in response to operator commanded change in load power 19 whose ultimate purpose is to increase or decrease said work done by the alternating current or direct current load 11. This change in work will increase or decrease the generated power flow 22 from the alternating current generator 13 to the alternating current or direct current load 11. This change in generated power flow 22 can create electrical instabilities in the IPS 10, resulting in increased wear and increased required maintenance of the components within the IPS 10 and ultimately failure of the IPS 10. These changes in the generated power flow 22 must be managed and implemented in order to avoid electrical instability. Within this embodiment of the present invention, the electrical instabilities of the IPS 10 are reduced and managed by the combination and coordination of the alternating current or direct current load controller 12, the generator voltage regulator 14, which includes a primer mover speed control, and the SCADA 17. The generated power flow 22 is managed in a predictable and stable way by anticipating the response of the IPS 10 to an operator commanded change in load power 19. The SCADA module 17 computes the optimal anticipated solution for implementing the operator commanded change in load power 19 from data accessed from the constant parameter set 20 and the dynamic parameter set 21. In the illustrated embodiment, this computed solution is implemented through the alternating current or direct current load controller 12 and the generator voltage regulator with prime mover speed control 14 where the coordination of this implementation is monitored and maintained via a generator to load signal line 15, a regulator to controller signal line 16, and a plurality of supervisory control and data acquisition signal lines 18. The generator to load signal line 15 may be comprised of a digital signal or a plurality of digital and analog signal lines collecting and transferring data on the status of the alternating current or direct current load 11 and the generator voltage regulator 14 with prime mover speed control. The signal distribution is meant to coordinate the alternating current or direct current load 11 and the alternating current i generator 13 both at a local level and to make data and analog signals available to a distributed level, for example to the alternating current or direct current load controller 12, the generator voltage regulator 14 with prime mover speed control, and the SCADA module 17.

Within the illustrated embodiment, the generator voltage regulator 14 with prime mover speed control and the alternating current or direct current load controller 12 communicate directly by means of the regulator to the controller signal line 16 in order to maintain local stasis control and the processing of signals from the SCADA module 17. This greatly reduces the computational and monitoring burdens of said SCADA module 17 by allowing this level of a localized stasis control while still being linked to, and communicating with, real-time signals of the IPS 10 via SCADA signal lines 18.

Figure 1B:
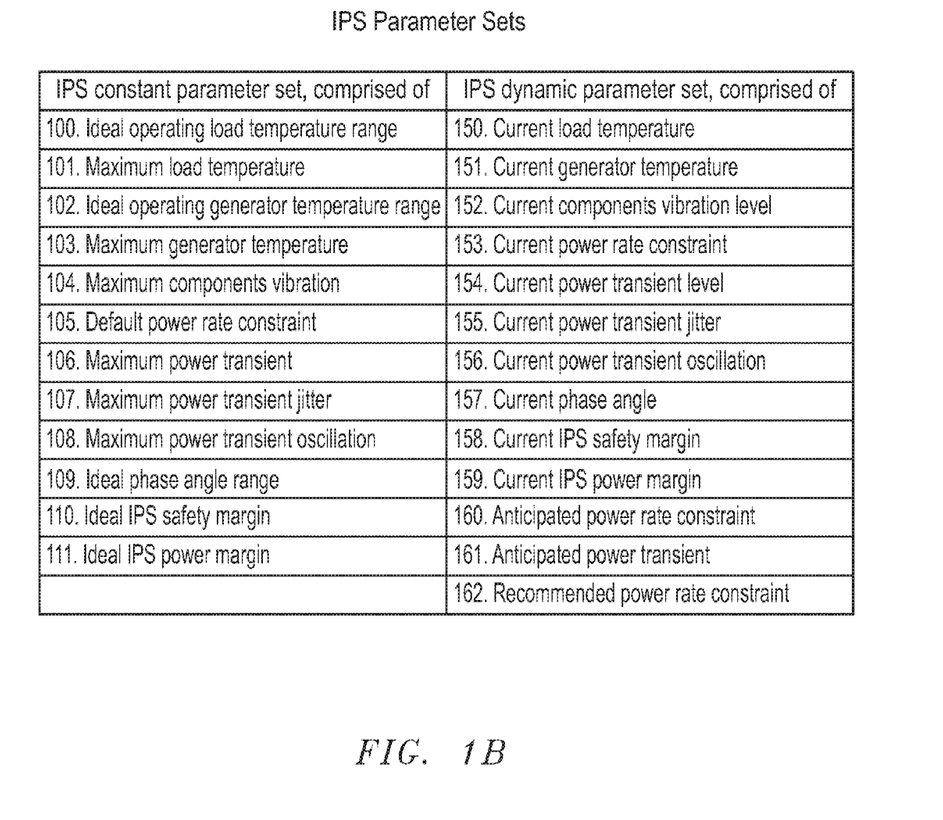

Referring to FIG. 1A, anticipatory control of the IPS 10 is implemented through computations performed by the SCADA module 17 with data from the dynamic parameter set 21 containing both measured and computed real-time data comprised of elements listed in FIG. 1B and the constant parameter set 20 containing fixed data comprised of elements listed in FIG. 1B characterizing the components of the integrated power system 10.

Referring to FIG. 1B, the constant parameter set may be comprised of IPS 10 data including: an ideal operating load temperature range 100, a maximum load temperature allowed 101, an ideal operating generator temperature range 102, a maximum generator temperature allowed 103, a maximum components vibration level allowed 104, a default power rate constraint 105, a maximum power transient allowed 106, a maximum power transient jitter allowed 107, a maximum power transient oscillation allowed 108, an ideal power phase angle range 109, an ideal integrated power system safety margin 110, and an ideal IPS margin 111.

Further with reference to FIG. 1B, the dynamic parameter set may be comprised of integrated power system data including: a current load temperature 150, a current generator temperature 151, a current components vibration level 152, a current power rate constraint 153, a current power transient level 154, a current power transient jitter 155, a current power transient oscillation 156, a current voltage to load current phase angle 157, a current IPS safety margin 158, a current IPS power margin 159, an anticipated power rate constraint 160, an anticipated power transient 161, and a recommended power rate constraint 162. In accordance with the present invention, measuring, computing, and maintaining in real time all the elements comprising a dynamic parameter set provides the supervisory control and data acquisition module 17 the real-time data required to maintain the electrical stability of the IPS 10 and to calculate and implement power rate constraints derived from operator commanded change in load power 19. In the illustrated embodiment of FIGS. 1A and 1B, an externally adjusted power rate constraint is mediated by calculations performed by the SCADA module 17 in order to predict different possible IPS 10 responses to changes in the load power rate and to compute an optimal path through an IPS state space that optimizes the dynamic parameter set 21 elements including power transients 154, power transient jitter 155, and power transient oscillations 156. This process maintains the status of the IPS 10 to be within the ideal safety margin 110 and to provide the operator of the IPS 10 the ability to control the power flow 22 at will. Maintaining the safety margin 110 of the IPS 10 requires not only that the power flow 22 is within margin, but all the components of said system have acceptable measured status values comprising component temperatures, vibration levels, voltages, or a combination of suitable metrics.

Figure 2A:
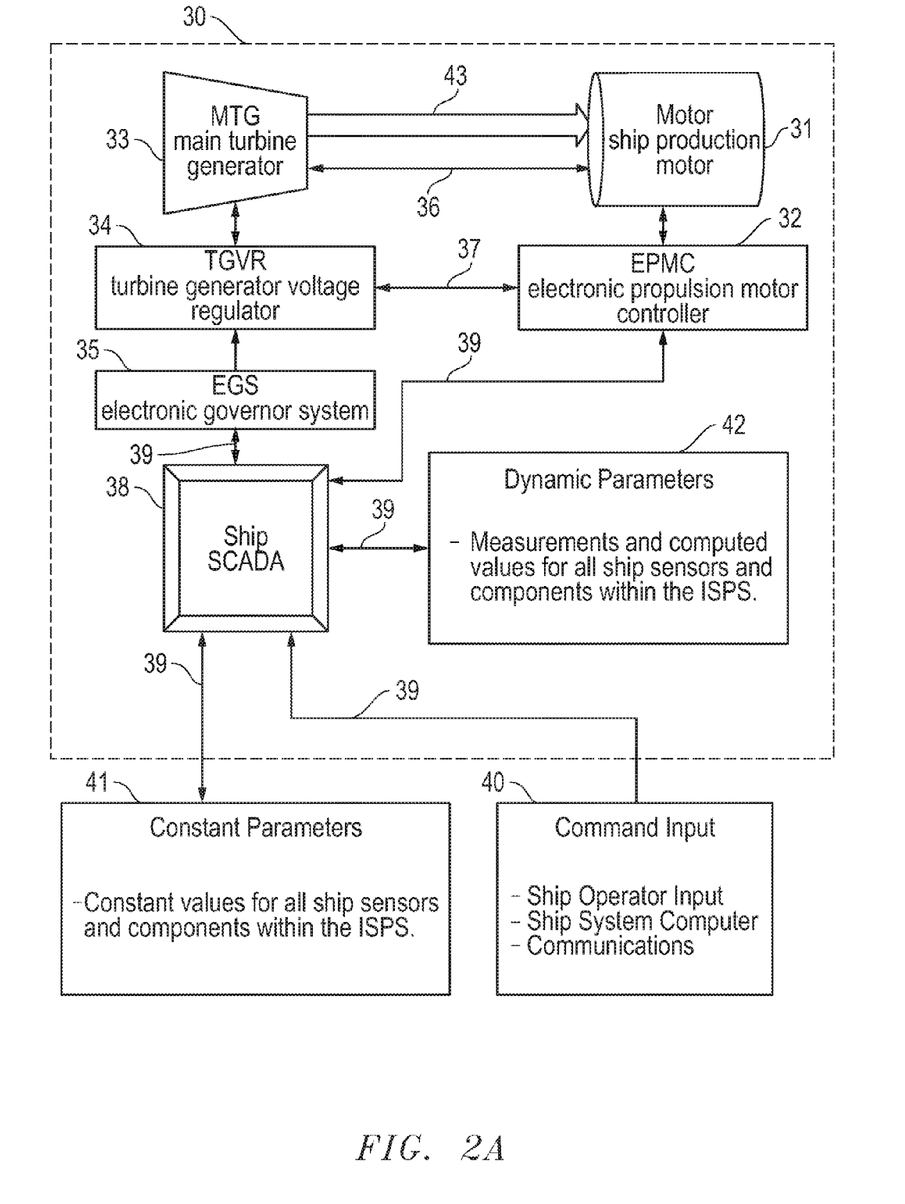
FIGS. 2A and 2B illustrate one embodiment of a very high power integrated power system involving alternating current power generation coupled to alternating current power components as applied to ship propulsion systems.
Figure 2B:
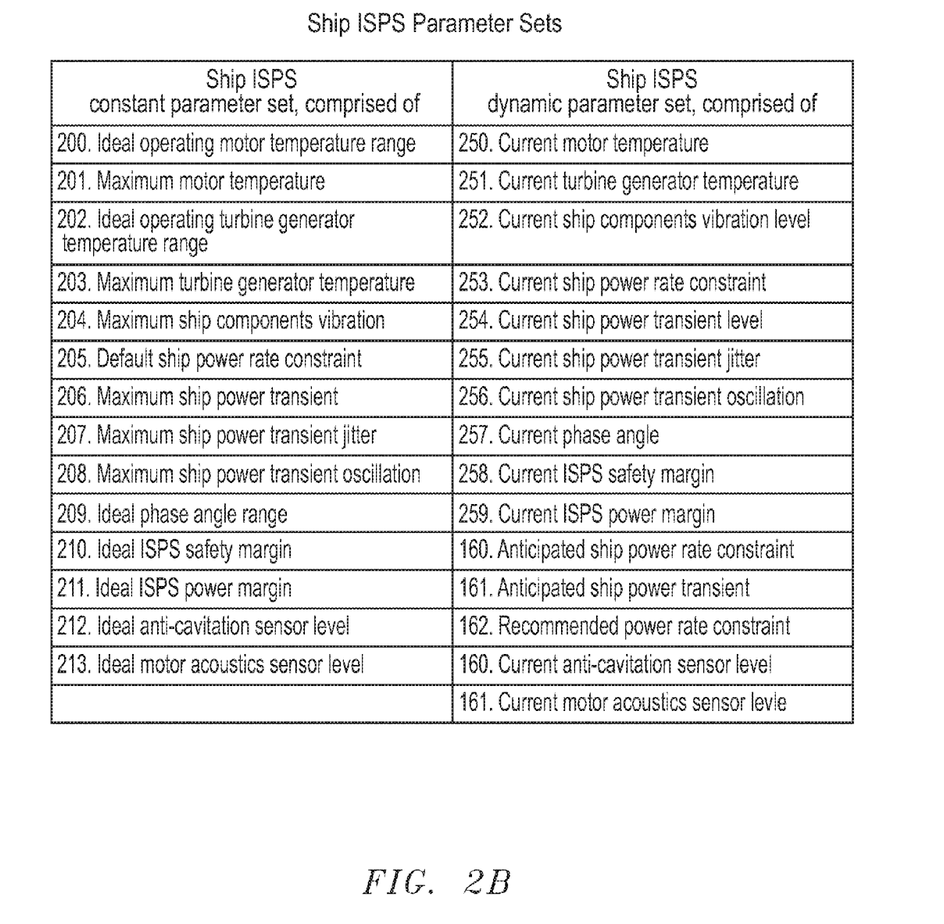

Referring to FIGS. 2A and 2B, a preferred embodiment of the present invention of a very high power integrated power system involving alternating current power generation coupled to alternating current and/or direct current power components is that applied to a ship propulsion system. FIG. 2A illustrates a block diagram functional view of one embodiment of an integrated ship power system 30 for operating a main generator 33 coupled to a ship propulsion motor 31. The propulsion motor or prime mover 31 can be a diesel engine, steam turbine, gas turbine, etc., for providing mechanical power that can be turned into electrical power. This load can be a single propulsion motor or a propulsion motor and the remainder of the ship's electrical systems which together constitute the total load that must be managed and will simply be referred to as "Motor".

The integrated ship power system 30 will receive input as an operator commanded change in ship velocity 40 which include commanded changes in motor torque, motor power, or IPS power and will be referred to simply as "ship velocity." The operator commanded change in ship velocity 40 is communicated to a ship SCADA module 38 which performs all the computations necessary for implementing the operator commanded change in ship velocity 40 as well as data collection and coordination of all the major components of the integrated ship power system 30. In this embodiment of the present invention, these components are comprised of the ship propulsion motor 31, a ship propulsion motor controller 32, the main generator 33, such as a turbine type generator, a generator voltage regulator 34, and an electronic governor system 35. The propulsion motor or prime mover controller 32 may be an automatic speed controller for the prime mover 31 of the generator 33 that transmits and receives control signals to and from the supervisory control and data acquisition system 38 and directly controls the speed of the prime mover 31.

The integrated ship power system 30 may also include a dynamic parameter set 42 containing data both measured and computed by the ship SCADA module 38 and comprised of elements listed in FIG. 2B to be reviewed below. The integrated ship power system 30 may also include accessed data in the form of a constant parameter set 41 containing fixed data characterizing the components of the integrated ship power system 30 and required by the ship SCADA module 38 and comprised of elements listed in FIG. 2B to be reviewed below. The integrated ship power system 30 may also include the capacity to receive commanded input in the form of the operator commanded change in ship velocity 40 which may be comprised of operator initiated commands for changes in the ship velocity, due to control changes to the torque, power, or speed of the motor to propeller, control input originating from a navigation computer, and control input originating from a connected communications line. In this embodiment of the present invention, all legitimate command inputs originating from the operator commanded change in ship velocity input 40 is to be processed by the ship SCADA module 38.

Referring to FIG. 2A, the ship propulsion motor 31 is controlled by the ship propulsion motor controller 32 and is subject to be responsive in the way of increasing or decreasing work done which increases or decreases the load burden to the main turbine generator 33. In this embodiment, these changes are in response to operator commanded change in ship velocity 40 whose ultimate purpose is to increase or decrease said work done by the ship propulsion motor 31. This change in work will increase or decrease the generated power flow 43 from the main turbine generator 33 13 to the ship propulsion motor 31. This change in generated power flow 43 can create electrical instabilities in the integrated ship power system 30, resulting in increased wear and increased required maintenance of the components within the integrated ship power system 30 and ultimately failure of the integrated ship power system 30. These changes in the generated power flow 43 must be managed and implemented in order to avoid electrical instability. Within this embodiment of the present invention, the electrical instabilities of the integrated ship power system 30 are reduced and managed by the combination and coordination of the ship propulsion motor controller 32, the generator voltage regulator 34, the electronic governor system 35, and the ship SCADA module 38. The generated power flow 43 is managed in a predictable and stable way by anticipating the response of the integrated ship power system 30 to an operator commanded change in ship rate 40.

The ship SCADA module 38 computes the optimal anticipated solution for implementing the operator commanded change in ship velocity 40 from data accessed from the constant parameter set 41 and the dynamic parameter set 42. In the illustrated embodiment, this computed solution is implemented through the ship propulsion motor controller 32, the generator voltage regulator 34, and the electronic governor system 35 where the coordination of this implementation is monitored and maintained via a main generator to motor signal line 36, a turbine generator regulator to electric propulsion motor controller signal line 37, and a plurality of ship supervisory control and data acquisition signal lines 39. The main generator to motor signal line 36 may be comprised of a digital signal or a plurality of digital and analog signal lines collecting and transferring data on the status of the ship propulsion motor 31 and the generator voltage regulator 34. The signal distribution is meant to coordinate the ship propulsion motor 31 and the main turbine generator 33 both at a local level and to make data and analog signals available to a distributed level, for example to the ship propulsion motor controller 32, the generator voltage regulator 34, the electronic governor system 35, and the SCADA module 38.

Within the illustrated embodiment, the generator voltage regulator 34 and the ship propulsion motor controller 32 communicate directly via the turbine generator regulator to the electric propulsion motor controller signal line 37 in order to maintain local stasis control and the processing of signals from the ship SCADA module 38. This greatly reduces the computational and monitoring burdens of said supervisor control data acquisition module 38 by allowing this level of a localized stasis control while still being linked to, and communicating with, real-time signals of the integrated ship power system 30 via ship SCADA signal lines 39.

Referring to FIG. 2A, anticipatory control of the integrated ship power system 30 is implemented through computations performed by the SCADA module 38 with data from the dynamic parameter set 42 containing both measured and computed real-time data comprised of elements listed in FIG. 2B and the constant parameter set 41 containing fixed data comprised of elements listed in FIG. 2B characterizing the fixed components of the integrated ship power system 30. Referring to FIG. 2B, the constant parameter set may be comprised of integrated ship power system 30 data including: an ideal operating motor temperature range 200, a maximum motor temperature allowed 201, an ideal operating turbine generator temperature range 202, a maximum turbine generator temperature allowed 203, a maximum ship components vibration level allowed 204, a default ship power rate constraint 205, a maximum ship power transient allowed 206, a maximum ship power transient jitter allowed 207, a maximum ship power transient oscillation allowed 108, an ideal ship power phase angle range 209, an ideal integrated ship power system safety margin 210, an ideal integrated ship power system power margin 211, an ideal anti-cavitation sensor level 212, and an ideal motor acoustics sensor level.

With further reference to FIG. 2B, the dynamic parameter set may be comprised of integrated ship power system 30 data including: a current motor temperature 250, a current turbine generator temperature 251, current ship components vibration level 252, a current ship power rate constraint 253, a current ship power transient level 254, a current ship power transient jitter 255, a current ship power transient oscillation 256, a current ship voltage to load current phase angle 257, a current integrated ship power system safety margin 258, a current integrated ship power system power margin 259, an anticipated ship power rate constraint 260, an anticipated ship power transient 261, a recommended ship power rate constraint 262, a current anti-cavitation sensor level 263, and a current motor acoustics sensor level 264. In accordance with the present invention, measuring, computing, and maintaining in real time all the elements comprising a dynamic parameter set 42 provides the ship SCADA module 38 the real-time data required to maintain the electrical stability of the integrated ship power system 30 and to calculate and implement ship power rate constraints derived from operator commanded change in ship rate 40. In the illustrated embodiment of FIGS. 2A and 2B, an externally adjusted ship power rate constraint is mediated by calculations performed by the ship SCADA module 38 in order to predict different possible integrated ship power system 30 responses to changes in the motor power rate and to compute an optimal path through an integrated ship power system state space that optimizes the dynamic parameter set 42 elements including the ship power transients 254, the ship power transient jitter 255, and the ship power transient oscillations 256. This process maintains the status of the integrated ship power system 30 to be within the ideal ship safety margin 210 and to provide the operator of the integrated ship power system 30 the ability to control the power flow 43 at will. Maintaining the ship safety margin 210 of the integrated ship power system 30 requires not only that the power flow 43 is within margin, but all the components of said ship system have acceptable measured status values comprising ship component temperatures, vibration levels, voltages, or a combination of suitable metrics.

Figure 3A:
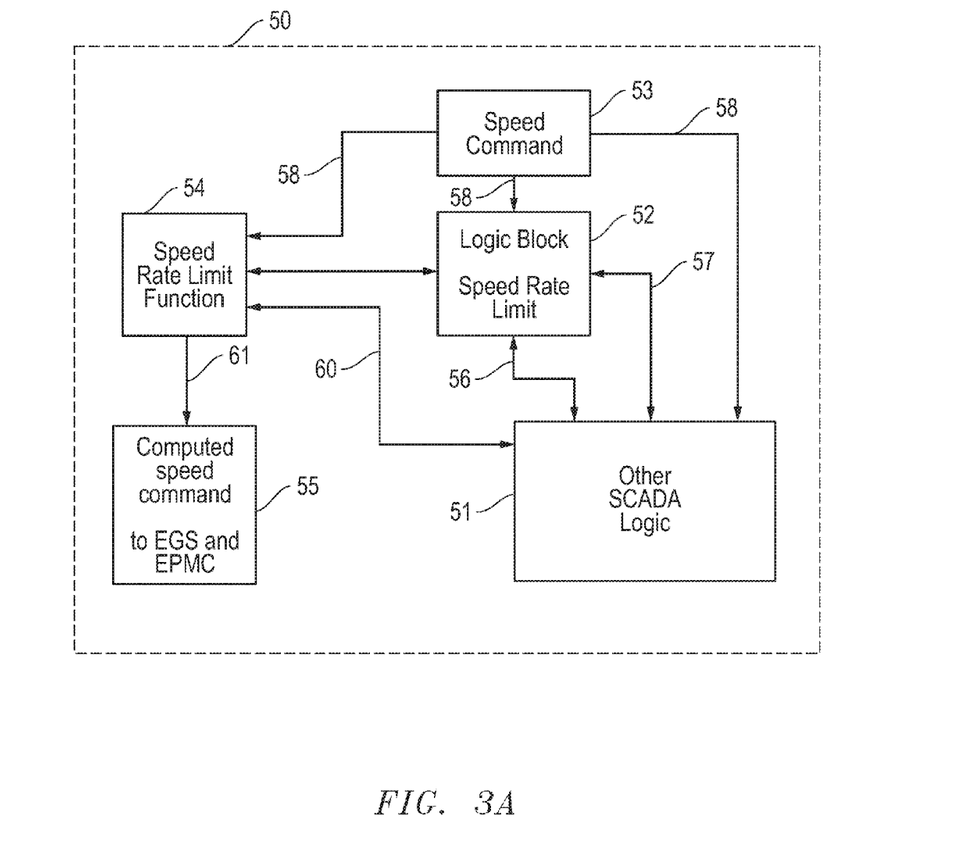
FIG. 3A illustrates one embodiment of a power rate of change system as applied to a motor control system.

FIG. 3A illustrates one embodiment of a power rate of change system as applied to a ship motor control system. The receipt of a speed command 53 is communicated to three logic blocks via the speed command signal line 58: a speed rate limit function 54, a speed rate limit logic block 52, and a main supervisory control and data acquisition logic block 51. The speed rate limit logic block 52 compares the speed, command 53 with the recommended ship power rate constraint (262 of FIG. 2B) from the main supervisory control and data acquisition logic block 51, by means of the motor power rate of change data signal line 56, and communicates the computed result to the speed rate limit function 54, via the logic block signal line 59. A final computed speed command 55 is calculated and the information is passed using the computed speed command signal line 61, by the speed rate limit function 54 that takes as input its input the computed result of the speed rate limit logic block 52, and other logic results from the main supervisory control and data acquisition logic 51 with the control signals being communicated using the components status signal line 60, which allows the speed rate limit function 54 to take into consideration the status of all ship components, and effect the final computed speed command upon the components of the integrated ship power system. All of this logic or computational steps can take place within one module, such as the ship supervisory command and data acquisition module 50, but can be distributed in logical forms and modules as illustrated in the embodiment of the present invention in FIG. 3A.

Figure 3B:
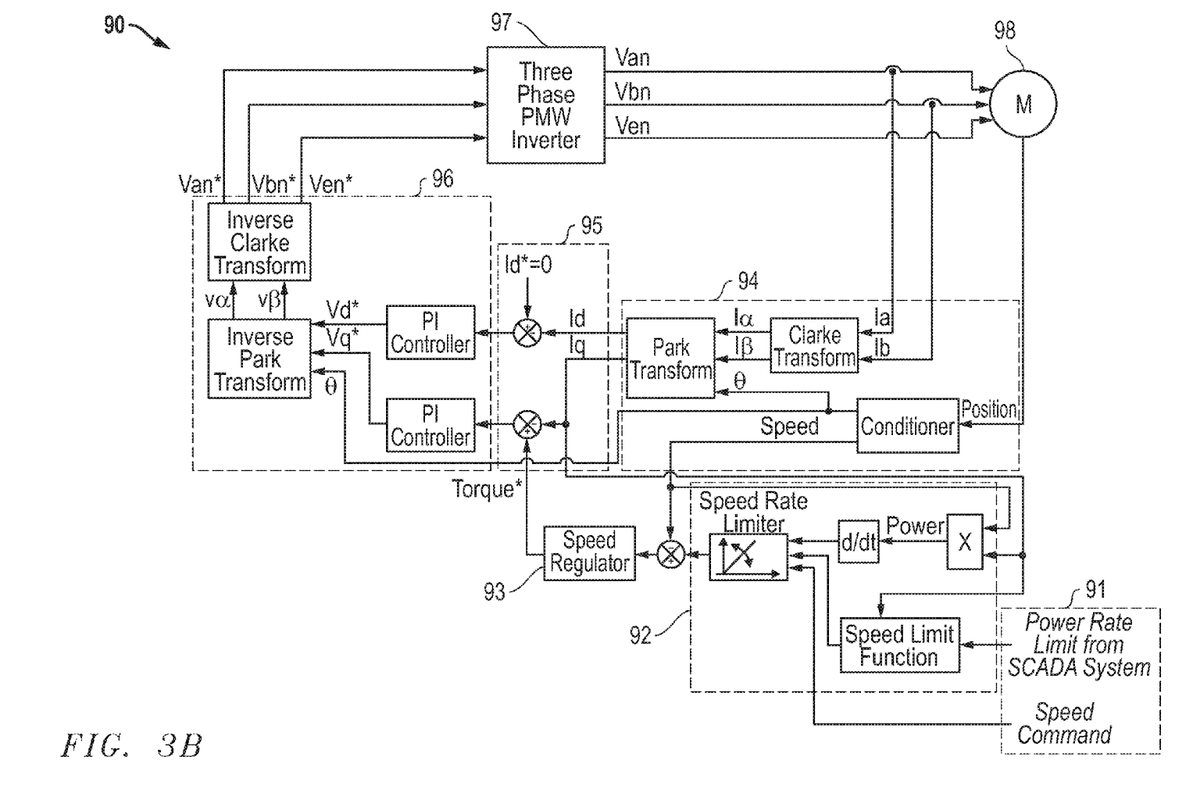
FIG. 3B illustrates one embodiment of a power rate of change system as applied to a variable synchronous motor control system.

FIG. 3B illustrates one embodiment of a power rate of change system as applied to a variable synchronous motor control system 90. In this embodiment, the power rate constraint is achieved by adjusting a speed command in the motor drive control input 91. This command is constrained by a speed rate limiter function input 91 from the SCADA (analogous in function to the speed rate limit function 54 of FIG. 3A) and is derived from a power rate limit signal received from the SCADA and the calculated motor power rate-of-change (analogous in function to 253 and 262 of FIG. 2B respectively).

Figure 4:
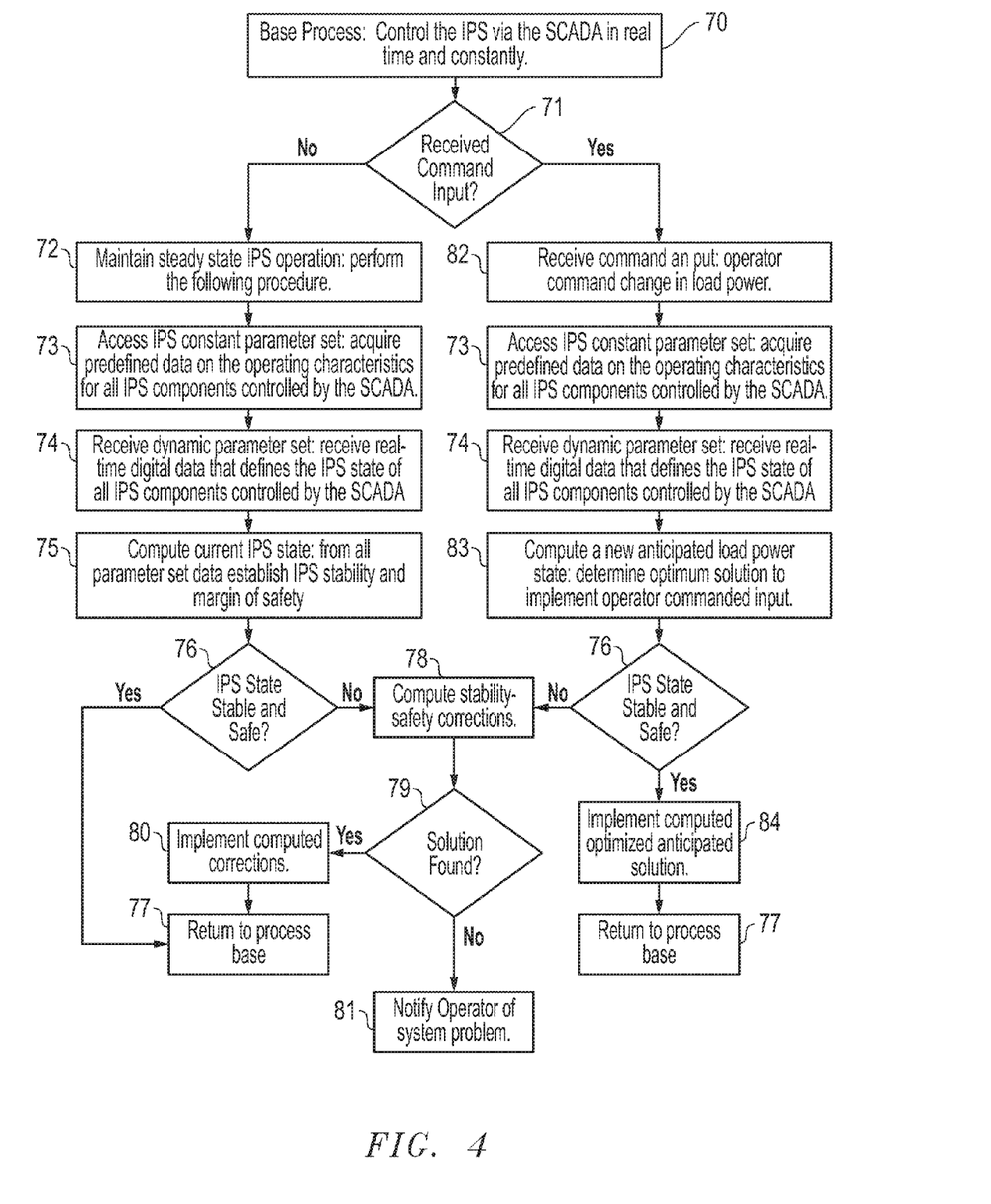
FIG. 4 is a flowchart demonstrating one embodiment of a method that may be used with the system of FIG. 1.

The power rate of change is computed by taking the time derivative of the motor mechanical power and is computed within a power rate of change limit function block 92. This result is combined with current state of the synchronous motor 98 and fed into a speed regulator 93. Logic within the speed rate limiter block of the power rate of change limit function block 92 determines if the synchronous motor 98 power rate-of-change control input 91 exceeds the allowable value established by the SCADA system. If so, the synchronous motor 98 speed change is restricted to control the rate of change of motor power via the interaction of the motor speed regulator 93, a control feedback block 94, and the control multiplier block 95. The final stabilized rate will be implemented via a control drive block 96 which drives a three-phase inverter block 97 that directly drives the synchronous motor 98. This control configuration is one example of implementing a power rate of change limit in a motor control system. Other variants are possible and the approach is independent of the type of motor or motor control power converter. FIG. 4 is a flowchart demonstrating one embodiment of a method that may be used with the system of FIGS. 1A and 1B. The method flow begins at the base process 70 used as a common beginning and ending point for a single method cycle. The base process 70 provides constant and real-time control of the integrated power system (denoted IPS in the figure) via the supervisory control and data acquisition module (denoted SCADA in the figure). The existence of a received command input is queried at the pole for input command 71. This can be performed on a timed interval, on a series computer system digital interrupt signals, or on a combination of these methods. This embodiment of the illustrated invention does not depend on any one method for polling for input command. If a command is not received, a steady-state maintenance process is entered into 72 or if a command is received, then it is processed 82.

1. If a command is not received, then the method of steady-state maintenance processing 72 begins with accessing 73 the constant parameter set of the integrated power system to acquire predefined data on the operating characteristics of all integrated power system components controlled by the supervisory control and data acquisition module. Further processing 74 receives the dynamic parameter set comprised of real-time digital data that defines the integrated power system state of all components controlled by the supervisory control and data acquisition module. A current state of the integrated power system is computed 75 from all parameter set data. If the current state of the integrated power system is safe 76, then the method can simply return to base process 70. If the current state of the integrated power system is not safe, then stability safety corrections need to be computed 78. If a computed solution was found 79, then the solution must be implemented 80 were the method can return to base process 70. If no stability safety correction can be computed, for whatever reason, the operator of the integrated power system must be notified of the problem 81.

2. If a command is received, then the method of command implementation processing 82 begins with accessing 73 the constant parameter set of the integrated power system to acquire predefined data on the operating characteristics of all integrated power system components controlled by the supervisory control and data acquisition module. Further processing 74 receives the dynamic parameter set comprised of real-time digital data that defines the integrated power system state of all components controlled by the supervisory control and data acquisition module. A new anticipated load power state that defines the optimum solution to implement the operator command input and compute a recommended power rate constraint is now computed 83. A current state of the integrated power system must be known for the command input can be processed. This is computed 75 from all parameter set data. If the current state of the integrated power system is safe 76, then the method can simply implement the computed optimized anticipated solution 84 and then return to process base 70. If the current state of the integrated power system is not safe, then stability safety corrections need to be computed 78. If a computed solution is found 79, then the solution must be implemented 80 were the method can return to base process 70. If no stability safety correction can be computed, for whatever reason, the operator of the integrated power system must be notified of the problem 81.

The foregoing disclosure and description of the invention are illustrative and explanatory thereof, and various changes in the size, shape and materials, as well as in the details of the illustrated construction may be made without departing from the spirit of the invention.

What is claimed is:
1. A method for defining and implementing a real-time and anticipatory integrated power system comprising of an alternating current or direct current load, a main alternating current generator, and a supervisory control and data acquisition system, comprising the steps of:

receiving in the supervisory control and data acquisition system an input signal corresponding to operator commanded change in load power;

accessing in the supervisory control and data acquisition system a constant parameter set of data containing predefined data on the operating characteristics of the integrated power system and data for all the integrated power system components under the control of the supervisory control and data acquisition system;

receiving in the supervisory control and data acquisition system a dynamic parameter set of data containing digital data that defines the integrated power system state and margins of safety of integrated power system components and generating digital control signals to increase or decrease generated power rate of said load and said venerator for maintaining real-time anticipatory control of the alternating current inductive load and generator; and, computing in the supervisory control and data acquisition system a new dynamic parameter set of data corresponding to new real-rime and anticipated load power state of the integrated power system from the operator commanded change in load power input, the dynamic parameter set, and the constant parameter set values in order to implement operator commanded change in load power and the rate of power delivered to the alternating current or direct current load in the integrated power system within standards of integrated power system stability defined in the constant parameter set of data.

2. The method of claim 1 wherein the supervisory control and data acquisition system computes real-time and anticipatory characteristics of the energy flow from the generator to the load and a rate at which the power can change, all from the commanded change in load power, constant parameter set, and dynamic parameter set data values.

3. The method of claim 1 wherein the supervisory control and data acquisition system dynamic parameter set includes measured and calculated values for real-time and anticipatory system power margin.

4. The method of claim 1 wherein the supervisory control and data acquisition system dynamic parameter set includes measured and calculated values for real-time power transient characteristics with respect to the commanded change in load power.

5. The method of claim 1 wherein the supervisory control and data acquisition system dynamic parameter set includes calculated values for anticipated power transient with respect to the commanded change in load power.

6. The method of claim 1 wherein the supervisory control and data acquisition system dynamic parameter set includes real-time and anticipated measured and calculated values for all integrated power system sensors and sensor systems.

7. The method of claim 1 wherein the supervisory control and data acquisition system dynamic parameter set, includes calculated power rate constraints that can be enforced upon the motor with respect to the commanded change in load power.

* * * * *